(12) United States Patent
Maruyama et al.

(10) Patent No.: US 11,718,006 B2
(45) Date of Patent: Aug. 8, 2023

(54) MATERIAL DELIVERY DEVICE, THREE-DIMENSIONAL SHAPING DEVICE, AND INJECTION MOLDING DEVICE

(71) Applicant: Seiko Epson Corporation, Tokyo (JP)

(72) Inventors: Hidenobu Maruyama, Azumino (JP); Daichi Miyashita, Matsumoto (JP); Yasuyuki Tanaka, Shiojiri (JP)

(73) Assignee: SEIKO EPSON CORPORATION

( * ) Notice: Subject to any disclaimer, the term of this patent is extended or adjusted under 35 U.S.C. 154(b) by 178 days.

(21) Appl. No.: 17/380,151

(22) Filed: Jul. 20, 2021

(65) Prior Publication Data

US 2022/0024097 A1 Jan. 27, 2022

(30) Foreign Application Priority Data

Jul. 21, 2020 (JP) ................................. 2020-124262

(51) Int. Cl.
| | | |
|---|---|---|
| *B29C 45/47* | (2006.01) | |
| *B29C 64/209* | (2017.01) | |
| *B29C 64/295* | (2017.01) | |
| *B29C 45/17* | (2006.01) | |
| *B29C 45/77* | (2006.01) | |

(Continued)

(52) U.S. Cl.
CPC .......... *B29C 45/47* (2013.01); *B29C 45/1734* (2013.01); *B29C 45/74* (2013.01); *B29C 45/77* (2013.01); *B29C 64/209* (2017.08); *B29C 64/295* (2017.08); *B29C 2045/1739* (2013.01);

(Continued)

(58) Field of Classification Search
CPC ..... B29C 45/74; B29C 45/1734; B29C 45/47; B29C 2045/1739; B29C 2945/7621
See application file for complete search history.

(56) References Cited

U.S. PATENT DOCUMENTS 4,470,786 A * 9/1984 Sano ..................... H01L 21/565
425/149
6,299,349 B1 * 10/2001 Steinel ................... G01L 23/10
73/714

(Continued)

FOREIGN PATENT DOCUMENTS

JP H06-198689 A 7/1994

*Primary Examiner* — Emmanuel S Luk
(74) *Attorney, Agent, or Firm* — Harness, Dickey & Pierce, P.L.C.

(57) ABSTRACT

A material delivery device includes: a plasticizing unit including a screw; a nozzle through which a plasticized material is delivered to outside; a communication flow path provided between the screw and the nozzle and through which the plasticized material flows; a pressure detection unit including a first cylinder coupled to the communication flow path, a rod inserted into the first cylinder, and a pressure sensor disposed with the rod separated from the communication flow path, in which the rod is configured to receive a pressure of the plasticized material in the communication flow path at a first end surface facing the communication flow path, and transmit the pressure to the pressure sensor through a second end surface opposite to the first end surface; and a rotation regulation mechanism configured to regulate rotation of the rod about a central axis along a longitudinal direction of the rod by engaging a first engaging portion provided on a side surface of the rod and a second engaging portion to be engaged with the first engaging portion.

14 Claims, 9 Drawing Sheets

(51) Int. Cl.
*B29C 45/74* (2006.01)
*B33Y 30/00* (2015.01)

(52) U.S. Cl.
CPC ............... *B29C 2945/76006* (2013.01); *B29C 2945/7621* (2013.01); *B33Y 30/00* (2014.12)

(56) References Cited

U.S. PATENT DOCUMENTS

| | | | | |
|---|---|---|---|---|
| 11,565,452 | B2* | 1/2023 | Maruyama | B29C 45/706 |
| 2011/0254183 | A1* | 10/2011 | Maris-Haug | G01N 11/08 |
| | | | | 425/170 |
| 2019/0277810 | A1* | 9/2019 | Yang | G01N 29/223 |
| 2019/0337209 | A1* | 11/2019 | Collins | B29C 45/766 |
| 2020/0016833 | A1* | 1/2020 | Yuwaki | B29C 64/118 |
| 2020/0406531 | A1* | 12/2020 | Hashimoto | B29C 64/321 |
| 2021/0031423 | A1* | 2/2021 | Yamashita | B29C 45/74 |
| 2021/0197434 | A1* | 7/2021 | Anegawa | B29C 45/54 |
| 2021/0387394 | A1* | 12/2021 | Maruyama | B29C 45/464 |
| 2022/0024092 | A1* | 1/2022 | Maruyama | B29C 64/329 |
| 2022/0032536 | A1* | 2/2022 | Anegawa | B29C 64/232 |
| 2022/0063156 | A1* | 3/2022 | Maruyama | B29C 45/60 |
| 2022/0126521 | A1* | 4/2022 | Hashimoto | B29C 64/209 |
| 2022/0363007 | A1* | 11/2022 | Zhang | B33Y 30/00 |
| 2022/0410456 | A1* | 12/2022 | Kobayashi | B29C 64/209 |

\* cited by examiner

MATERIAL DELIVERY DEVICE, THREE-DIMENSIONAL SHAPING DEVICE, AND INJECTION MOLDING DEVICE

The present application is based on, and claims priority from JP Application Serial Number 2020-124262, filed Jul. 21, 2020, the disclosure of which is hereby incorporated by reference herein in its entirety.

BACKGROUND

1. Technical Field

The present disclosure relates to a material delivery device, a three-dimensional shaping device, and an injection molding device.

2. Related Art

Regarding an injection molding device, JP-A-06-198689 discloses a technique in which a pressure of an injection resin injected into a mold by a plunger is detected by a pressure detection unit, and the pressure of the injection resin is controlled by feedback-controlling a position of the plunger based on the detected pressure.

As in JP A-06-198689, by controlling a mechanism such as the plunger based on the pressure of the resin in a flow path or the like of the device, it is possible to prevent molding defects due to insufficient injection of the resin or the like. Here, for example, when a heat source is provided near a detection position of a pressure, a pressure sensor may be disposed at a position away from the detection position, and the pressure of the resin may be measured via a rod disposed between the detection position and the pressure sensor. However, in this case, during the pressure detection, the rod rotates about an axis in a longitudinal direction, and there is a possibility that a flow of the resin at the detection position is obstructed depending on a shape of a tip end of the rod. Such a problem is not limited to the injection molding device, but is a problem common to a material delivery device provided with the pressure sensor as described above, a three-dimensional shaping device, or the like.

SUMMARY

According to a first aspect of the present disclosure, a material delivery device is provided. The material delivery device includes: a plasticizing unit including a screw and configured to plasticize a material by rotation of the screw to produce a plasticized material; a nozzle through which the plasticized material is delivered to outside; a communication flow path provided between the screw and the nozzle and through which the plasticized material flows; a pressure detection unit including a first cylinder coupled to the communication flow path, a rod inserted into the first cylinder, and a pressure sensor disposed with the rod separated from the communication flow path, in which the rod has a first end surface facing the communication flow path and a second end surface opposite to the first end surface in a longitudinal direction of the rod, and configured to receive a pressure of the plasticized material in the communication flow path at the first end surface and transmit the pressure to the pressure sensor through the second end surface; and a rotation regulation mechanism having a first engaging portion provided on a side surface of the rod and a second engaging portion to be engaged with the first engaging portion, and configured to regulate rotation of the rod about a central axis along the longitudinal direction of the rod by engaging the first engaging portion with the second engaging portion.

According to a second aspect of the present disclosure, a three-dimensional shaping device is provided. The three-dimensional shaping device includes: the material delivery device according to the first aspect; and a stage on which the plasticized material delivered from the nozzle is deposited.

According to a third aspect of the present disclosure, an injection molding device is provided. The injection molding device includes: the material delivery device according to the first aspect; an injection control unit having a second cylinder coupled to the communication flow path and a plunger moving in the second cylinder, and configured to weigh the plasticized material in the second cylinder and deliver the weighed plasticized material toward the nozzle; and a mold to which the plasticized material from the nozzle is delivered.

DESCRIPTION OF EXEMPLARY EMBODIMENTS

A. First Embodiment

Figure 1:
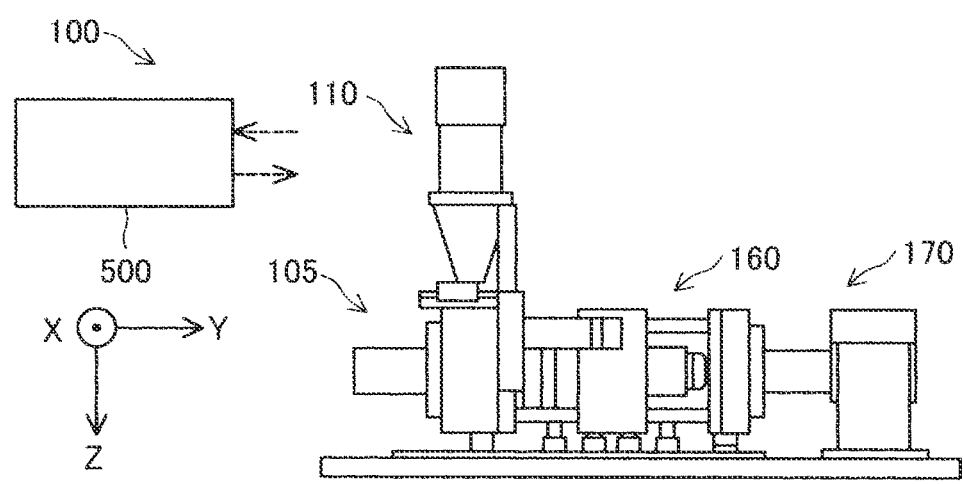
FIG. 1 is a diagram showing a schematic configuration of an injection molding device according to a first embodiment.

FIG. 1 is a diagram showing a schematic configuration of an injection molding device 100 according to the present embodiment. FIG. 1 shows arrows along X, Y, and Z directions which are orthogonal to each other. The X, Y, and Z directions are directions along an X axis, a Y axis, and a Z axis, which are three spatial axes orthogonal to each other, and each include a direction on one side along the X axis, the Y axis, and the Z axis and a direction opposite thereto. The X axis and the Y axis are axes along a horizontal plane, and the Z axis is an axis along a vertical line. The other figures also show arrows along the X, Y, and Z directions as appropriate. The X, Y, and Z directions in FIG. 1 and the X, Y, and Z directions in other figures represent the same directions.

The injection molding device 100 includes an injection unit 105, a material supply unit 110, a mold unit 260, a mold clamping device 270, and a control unit 500. In the injection molding device 100, a material supplied from the material supply unit 110 is plasticized by the injection unit 105 to generate a plasticized material, and the plasticized material is injected into the mold unit 260 to mold a molded product.

Figure 2:
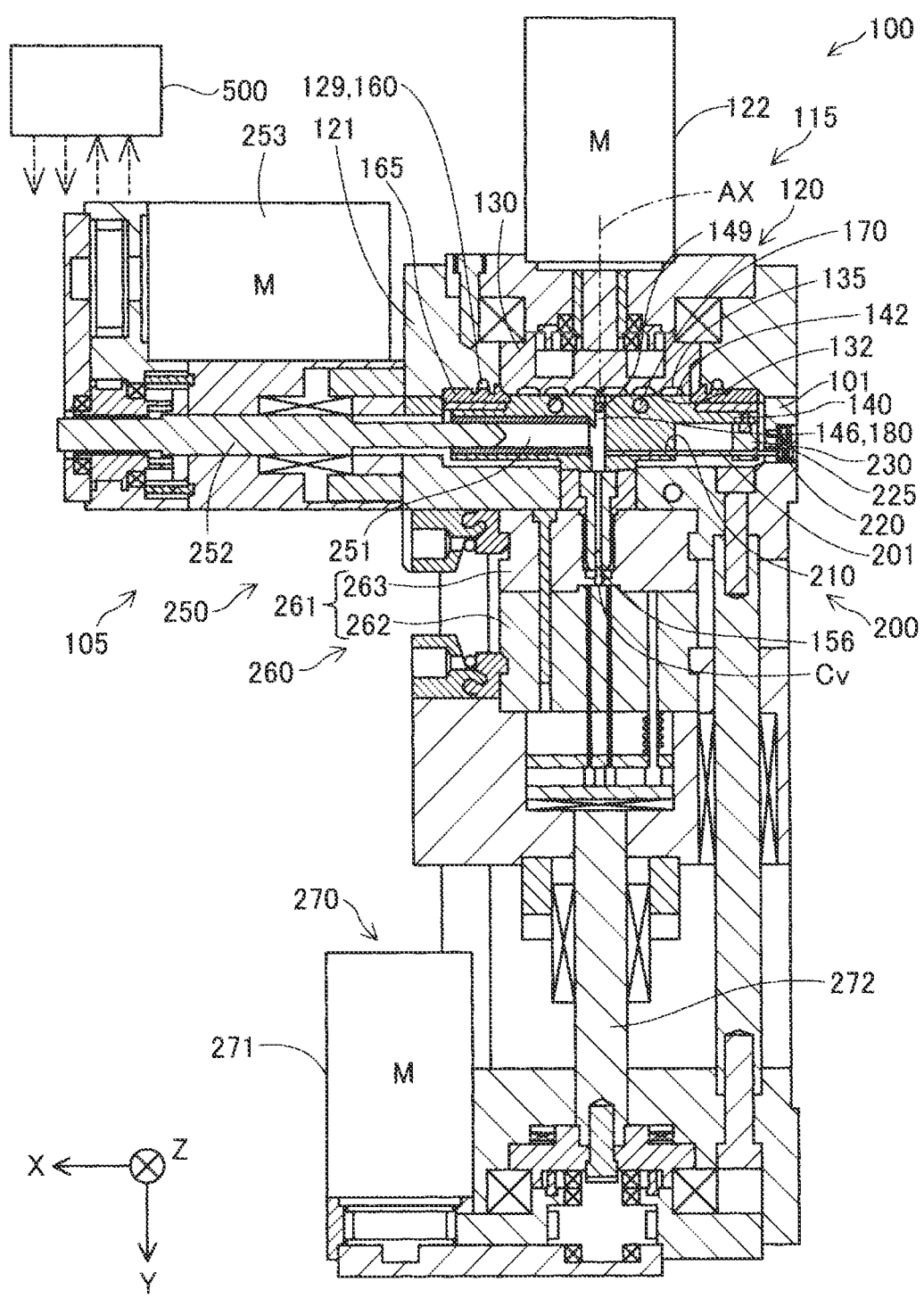
FIG. 2 is a cross-sectional view showing a schematic configuration of the injection molding device according to the first embodiment.

FIG. 2 is a cross-sectional view showing a schematic configuration of the injection molding device 100. FIG. 2 shows the injection unit 105, the mold unit 260, the mold clamping device 270, and the control unit 500 of the injection molding device 100. The injection unit 105 includes a material delivery device 115 and an injection control unit 250. The material delivery device 115 includes a plasticizing unit 120, a nozzle 156, and a pressure detection unit 200.

The material supply unit 110 shown in FIG. 1 communicates with the plasticizing unit 120 shown in FIG. 2. The material supply unit 110 supplies the material to the plasticizing unit 120 of the material delivery device 115. In the present embodiment, the material supply unit 110 is implemented by a hopper. The material in a state of pellets, powder, or the like is accommodated in the material supply unit 110. In the present embodiment, an ABS resin formed in a pellet shape is stored in the material supply unit 110 as the material.

As shown in FIG. 2, the plasticizing unit 120 includes a screw case 121, a drive motor 122, a screw 130, a barrel 140, a check valve 149, a cooling unit 160, and a heating unit 170. The plasticizing unit 120 plasticizes at least a part of the material supplied from the material supply unit 110, generates a plasticized material in a paste shape having fluidity, and then guides the plasticized material to the injection control unit 250. The term "plasticize" means that a material having thermoplasticity is softened by being heated to a temperature equal to or higher than a glass transition point, and exhibits fluidity. The term "melt" means that not only the material having thermoplasticity is heated to a temperature equal to or higher than a melting point to become a liquid, but also the material having thermoplasticity is plasticized. The screw 130 of the present embodiment is sometimes referred to as a "flat screw" or a "scroll".

The screw 130 has a substantially cylindrical shape in which a dimension in a direction along a screw central axis AX is smaller than a diameter. The screw 130 is accommodated in a space surrounded by the screw case 121 and the barrel 140. The screw 130 has a groove forming surface 132 in which a groove portion 135 is provided on a surface facing the barrel 140. Specifically, the groove forming surface 132 of the screw 130 faces a facing surface 142 of the barrel 140. A curved ridge portion 136 is formed on the groove forming surface 132. The screw central axis AX is sometimes referred to as a rotation axis of the screw 130. In FIG. 2, the screw central axis AX is shown by a chain double-dashed line.

The drive motor 122 is coupled to a surface of the screw 130 opposite to the groove forming surface 132. The screw 130 rotates about the screw central axis AX, which is a rotation axis, by a torque generated by the drive motor 122. The drive motor 122 is driven under control of the control unit 500. The drive motor 122 may not be directly coupled with the screw 130. For example, the screw 130 and the drive motor 122 may be coupled via a speed reducer. In this case, for example, the drive motor 122 may be coupled to a planetary gear of the speed reducer including a planetary gear mechanism, and the screw 130 may be coupled to a sun gear.

Figure 3:
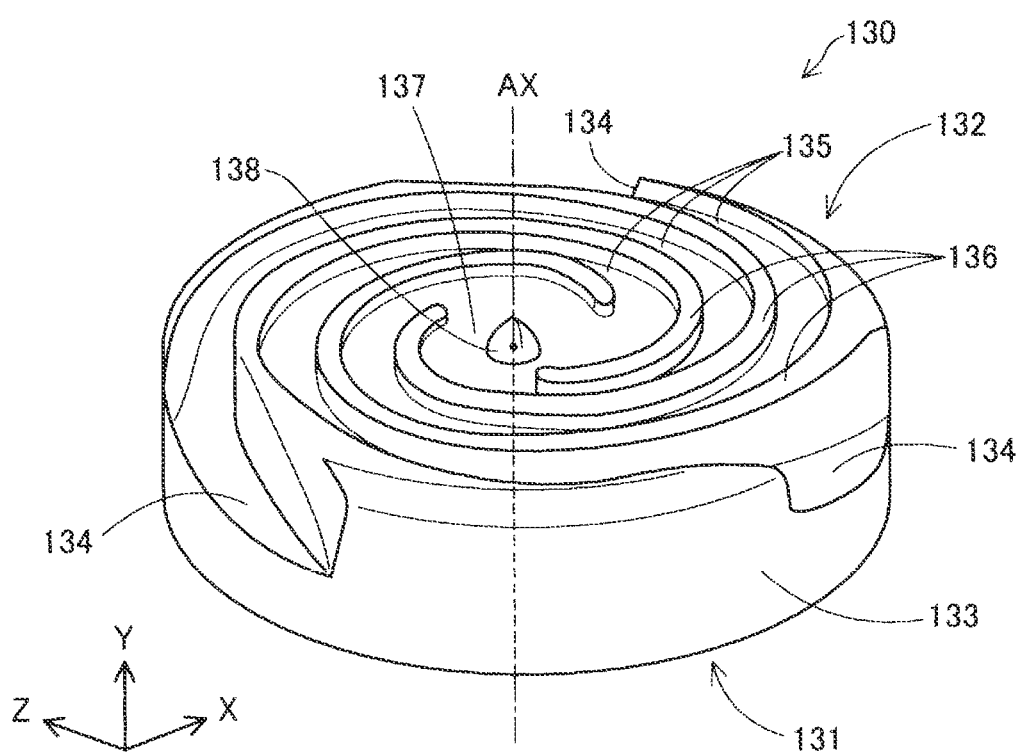
FIG. 3 is a perspective view showing a configuration of a screw on a groove forming surface side.

FIG. 3 is a perspective view showing a configuration of the screw 130 on the groove forming surface 132 side. In FIG. 3, a position of the screw central axis AX of the screw 130 is shown by a chain double-dashed line. As described above, the groove portion 135 is provided in the groove forming surface 132.

The groove portion 135 of the screw 130 constitutes a so-called scroll groove. The groove portion 135 extends from a central portion 137 toward an outer periphery of the screw 130 in a form of swirl so as to draw an arc. The groove portion 135 may be configured to extend in an involute curve shape or a spiral shape. The groove forming surface 132 is provided with ridge portions 136 that form side wall portions of the respective groove portions 135 and extend along the respective groove portions 135. The groove portion 135 is continuous to a material introduction port 134 provided on a screw side surface 133 of the screw 130. The material introduction port 134 is a portion for receiving the material in the groove portion 135. The material supplied from the material supply unit 110 is supplied between the screw 130 and the barrel 140 via the material introduction port 134.

The central portion 137 of the groove forming surface 132 of the screw 130 is implemented as a recess to which one end of the groove portion 135 is coupled. As shown in FIG. 2, the central portion 137 faces a communication hole 146 provided in the facing surface 142 of the barrel 140, which will be described later. The central portion 137 intersects the screw central axis AX.

The screw 130 of the present embodiment includes a retention reducing portion 138 protruding toward the communication hole 146 in the central portion 137. In the present embodiment, the retention reducing portion 138 has a substantially conical shape, and a central axis of the retention reducing portion 138 substantially coincides with the screw central axis AX of the screw 130. A tip end of the retention reducing portion 138 is disposed inside the communication hole 146 than an opening end of the communication hole 146 of the facing surface 142. Since the plasticized material in the central portion 137 is efficiently guided to the communication hole 146 by the retention reducing portion 138, the plasticized material in the central portion 137 is prevented from retention.

FIG. 3 shows an example of the screw 130 having three groove portions 135 and three ridge portions 136. The number of the groove portions 135 or the number of the ridge portions 136 provided on the screw 130 is not limited to three. The screw 130 may be provided with only one groove portion 135, or may be provided with two or more groove portions 135. Further, any number of the ridge portions 136 may be provided in accordance with the number of the groove portions 135.

FIG. 3 shows an example of the screw 130 in which the material introduction ports 134 are formed at three places. The number of the material introduction ports 134 provided in the screw 130 is not limited to three. In the screw 130, the material introduction port 134 may be provided at only one place, or may be provided at two or more places.

Figure 4:
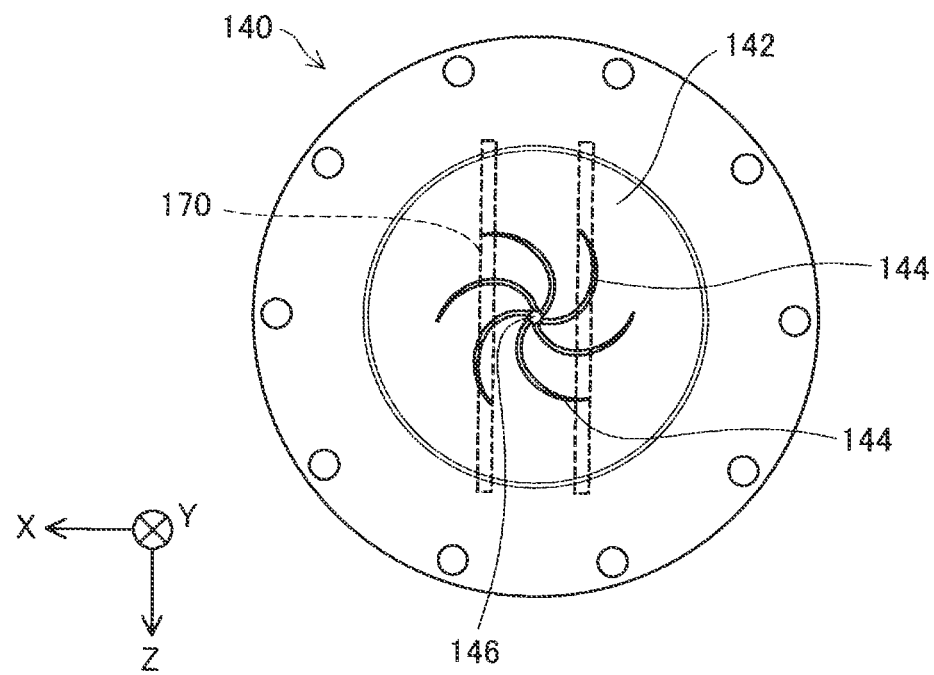
FIG. 4 is a diagram showing a configuration of a barrel on a facing surface side.

FIG. 4 is a diagram showing a configuration of the barrel 140 on the facing surface 142 side. As described above, the facing surface 142 is a surface facing the groove forming surface 132 of the screw 130. At a center of the facing surface 142, the communication hole 146 that communicates with the nozzle 156 shown in FIG. 2 is provided. The communication hole 146 forms at least a part of a communication flow path 180. The communication flow path 180 is a flow path provided between the screw 130 and the nozzle 156. The communication flow path 180 communicates with the nozzle 156. The plasticized material produced by the plasticizing unit 120 flows through the communication flow path 180 and is supplied to the nozzle 156. In the present embodiment, the communication hole 146 forms the entire communication flow path 180.

A plurality of guide grooves 144 are provided around the communication hole 146 in the facing surface 142. Each of the guide grooves 144 is coupled to the communication hole 146 at one end thereof, and extends in a swirl shape from the communication hole 146, respectively. Each of the guide grooves 144 includes a function of guiding the plasticized material to the communication hole 146. The guide grooves 144 may not be formed in the barrel 140.

The heating unit 170 heats the material supplied between the screw 130 and the barrel 140. The heating unit 170 is provided in the barrel 140. In the present embodiment, the heating unit 170 is implemented by two rod-shaped heaters embedded in the barrel 140 and disposed with the X direction as a longitudinal direction. Output of the heating unit 170 is controlled by the control unit 500. In other embodiments, for example, the heating unit 170 may be provided in contact with the barrel 140 instead of being embedded in the barrel 140, or may be provided in the screw 130.

As shown in FIG. 2, the cooling unit 160 cools a region of the plasticizing unit 120 closer to an outer peripheral portion of the barrel 140 than the communication hole 146 in the X and Z directions along the groove forming surface. The cooling unit 160 of the present embodiment is implemented by a refrigerant flow path defined by a flow path groove 129 and a cooling plate 165. The flow path groove 129 is a groove provided by opening a surface of the screw case 121 in the +Y direction along a circumferential direction of the screw 130. The cooling plate 165 is a flat plate-shaped member disposed between the screw case 121 and the barrel 140. Specifically, the cooling plate 165 is fixed to the screw case 121 by bolts so as to seal the flow path groove 129 from the +Y direction. The cooling unit 160 cools the plasticizing unit 120 by circulating a refrigerant such as water in the refrigerant flow path by, for example, a pump (not shown). The cooling unit 160 may include a refrigerator for cooling the refrigerant, a circulation device for circulating the refrigerant in the refrigerant flow path, or the like. Further, in another embodiment, the cooling unit 160 may be formed as, the refrigerant flow path or the like provided in, for example, the screw 130 and the barrel 140. A flow of the refrigerant in the cooling unit 160 is controlled by the control unit 500. The control unit 500 controls the flow of the refrigerant in the cooling unit 160 by controlling driving of the pump, the refrigerator, the circulation device, or the like described above.

The plasticizing unit 120 heats the material supplied between the screw 130 and the barrel 140 by the screw 130, the barrel 140, and the heating unit 170 while conveying the material toward the communication hole 146 to generate the plasticized material, and supplies the produced plasticized material to the nozzle 156 through the communication hole 146. Specifically, the plasticized material plasticized by the plasticizing unit 120 is weighed by the injection control unit 250 and supplied to the nozzle 156.

The check valve 149 is provided in the communication hole 146. The check valve 149 prevents backflow of the plasticized material from the communication hole 146 to the central portion 137 and the groove portion 135 of the screw 130.

The pressure detection unit 200 includes a first cylinder 210, a rod 201, a sensor unit 220, a sensor case 225, and a support portion 230. The first cylinder 210 is coupled to the communication flow path 180. That is, in the present embodiment, the first cylinder 210 is coupled to the communication hole 146. The rod 201 is inserted into the first cylinder 210. The pressure detection unit 200 detects the pressure of the plasticized material in the communication flow path 180 by the sensor unit 220 via the rod 201. The pressure detected by the sensor unit 220 is transmitted to the control unit 500 as an electric signal via a wiring (not shown). The details of a configuration of the pressure detection unit 200 will be described later.

The injection control unit 250 includes a second cylinder 251, a plunger 252, and a plunger drive unit 253. The second cylinder 251 is coupled to the communication flow path 180. That is, in the present embodiment, the second cylinder 251 is coupled to the communication hole 146. The second cylinder 251 of the present embodiment is coupled upstream of a coupling portion between the communication flow path 180 and the first cylinder 210 in the communication flow path 180. Therefore, in the present embodiment, the first cylinder 210 and the rod 201 are located downstream of the coupling portion between the communication flow path 180 and the second cylinder 251 in the communication flow path 180. The plunger 252 moves inside the second cylinder 251. The plunger 252 is driven by the plunger drive unit 253 implemented by a motor, a gear, or the like. The plunger drive unit 253 is controlled by the control unit 500.

The injection control unit 250 executes a weighing operation and an injection operation by sliding the plunger 252 in the second cylinder 251 under the control of the control unit 500. The weighing operation refers to an operation of weighing the plasticized material in the second cylinder 251 by moving the plunger 252 in the −X direction away from the communication flow path 180 to guide the plasticized material in the communication flow path 180 into the second cylinder 251. The injection operation refers to an operation of injecting the plasticized material in the second cylinder 251 into a mold via the nozzle 156 by moving the plunger 252 in the +X direction approaching the communication flow path 180. The movement of the plunger 252 in the direction away from the communication flow path 180 is sometimes called "retraction of the plunger 252". Further, the movement of the plunger 252 in the direction approaching the communication flow path 180 is sometimes called "advancement of the plunger 252".

As described above, the nozzle 156 communicates with the communication flow path 180. The material delivery device 115 delivers the plasticized material plasticized by the plasticizing unit 120 to the outside of the material delivery device 115 via the nozzle 156. In the present embodiment, by executing the weighing operation and the injection operation by the injection control unit 250 described above, the plasticized material weighed in the second cylinder 251 is delivered from the injection control unit 250 to the nozzle 156 via the communication hole 146, and is injected from the nozzle 156 to the mold unit 260.

The mold unit 260 includes a mold 261. The plasticized material delivered to the nozzle 156 is injected from the nozzle 156 into a cavity Cv of the mold 261. Specifically, the mold 261 has a movable mold 262 and a fixed mold 263 that face each other, and has the cavity Cv therebetween. The cavity Cv is a space corresponding to a shape of the molded product. In the present embodiment, the movable mold 262 and the fixed mold 263 are formed of a metal material. The movable mold 262 and the fixed mold 263 may be formed of a ceramic material or a resin material.

The mold clamping device 270 includes a mold drive unit 271 and a ball screw unit 272. The mold drive unit 271 is implemented by a motor, gears, or the like, and is coupled to the movable mold 262 via the ball screw unit 272. Driving of the mold drive unit 271 is controlled by the control unit 500. The ball screw unit 272 transmits power generated by the driving of the mold drive unit 271 to the movable mold 262. Under the control of the control unit 500, the mold clamping device 270 moves the movable mold 262 using the mold drive unit 271 and the ball screw unit 272 so as to open and close the mold unit 260.

The control unit 500 is a device that controls the injection unit 105 and the mold clamping device 270. The control unit 500 is implemented by, for example, a computer including one or more processors, a main storage device, and an input and output interface, and a combination of a plurality of circuits.

The control unit 500 controls the injection unit 105 and the mold clamping device 270 described above to execute injection molding processing for molding a molded product. The control unit 500 can control the injection control unit 250, the mold clamping device 270, or the like based on the pressure of the plasticized material in the communication flow path 180 detected by the pressure detection unit 200 described above in the injection molding processing. The pressure of the plasticized material in the communication flow path 180 changes depending on, for example, a change in an amount or state of the plasticized material produced by the plasticizing unit 120. Further, the pressure may also change depending on a shape of the cavity Cv of the mold unit 260. For example, when the plasticized material injected into the mold unit 260 passes through a part having a small flow path cross-sectional area of the cavity Cv, the pressure of the plasticized material in the communication flow path 180 is larger as compared with a case where the plasticized material passes through a part having a large flow path cross-sectional area of the cavity Cv.

For example, when performing the weighing operation in the injection molding processing, the control unit 500 adjusts a speed at which the plunger 252 is retracted according to the pressure of the plasticized material in the communication flow path 180, so that excess plasticized material can be prevented from being drawn into the second cylinder 251 and air can be prevented from being mixed into the plasticized material in the second cylinder 251. Further, for example, when performing the injection operation in the injection molding processing, the control unit 500 adjusts a speed at which the plunger 252 is advanced according to the pressure of the plasticized material in the communication flow path 180, so as to prevent the insufficient injection amount of the plasticized material injected into the mold unit 260 and the generation of residual stress due to the plasticized material being injected into the mold unit 260 with excessive pressure. Further, the control unit 500 may adjust, for example, a rotation speed of the drive motor 122 of the plasticizing unit 120, output of the cooling unit 160, output of the heating unit 170, or the like according to the pressure detected by the pressure detection unit 200, and may adjust a speed, a time, or the like for driving the mold clamping device 270. Accordingly, by controlling the injection unit 105 and the mold clamping device 270 according to the pressure detected by the pressure detection unit 200, even when the pressure of the plasticized material in the communication flow path 180 changes, a strength and quality of the molded product can be increased. The control unit 500 controls the injection unit 105 or the like according to the pressure detected by the pressure detection unit 200, and may control the injection unit 105 or the like based on a pressure calculated by, for example, performing statistical processing or the like on the pressure detected by the pressure detection unit 200.

Figure 5:
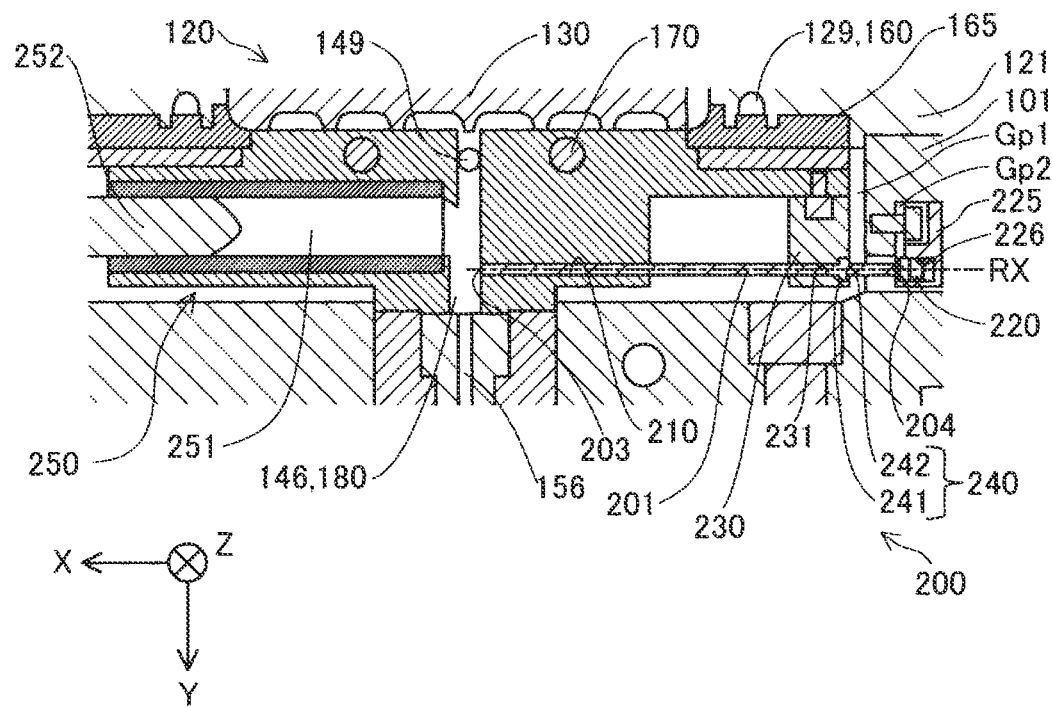
FIG. 5 is a diagram showing a schematic configuration of a pressure detection unit according to the first embodiment.

FIG. 5 is a diagram showing a schematic configuration of the pressure detection unit 200. The first cylinder 210 of the present embodiment is a hole provided in the barrel 140 along the X direction and having an opening in a side surface of the barrel 140 and an inner wall of the communication hole 146. A cross section of the first cylinder 210 perpendicular to the X direction has a circular shape. In another embodiment, the first cylinder 210 may be implemented by, for example, a tubular member having an opening in the side surface of the barrel 140 and the inner wall of the communication hole 146.

The rod 201 is a shaft-shaped member inserted into the first cylinder 210. The rod 201 is disposed along the first cylinder 210 with the X direction as the longitudinal direction. The rod 201 has a first end surface 203 and a second end surface 204 opposite to the first end surface 203 in the X direction. The first end surface 203 is an end surface of the rod 201 facing the communication flow path 180, that is, the communication hole 146. By inserting the rod 201 into the first cylinder 210, a space between the rod 201 and the first cylinder 210 is kept liquid tight such that the plasticized material does not leak to the outside through at least the first cylinder 210.

The sensor unit 220 is disposed with the rod 201 separated from the communication flow path 180 in the X direction. The sensor unit 220 of the present embodiment is disposed adjacent to the rod 201 in the −X direction of the rod 201 without having a gap between the sensor unit 220 and the rod 201. Specifically, the sensor unit 220 is supported by a sensor holding portion 226, which is a space inside the sensor case 225. The sensor case 225 is fixed to a side surface portion 101 of the injection molding device 100 via bolts. A gap Gp1 and a gap Gp2 are formed between the sensor case 225 and the barrel 140, and between the sensor unit 220 and the barrel 140. The gap Gp1 is a gap formed between the barrel 140 and the side surface portion 101, and the gap Gp2 is a space formed between the side surface portion 101 and the sensor case 225 and between the side surface portion 101 and the sensor unit 220. By these gaps, a thermal influence of heating by the heating unit 170 is prevented from reaching the sensor unit 220, and the pressure detection accuracy of the sensor unit 220 is prevented from being lowered due to the thermal influence. In the present embodiment, since the gap Gp1 and the gap Gp2 are formed, for example, as compared with a case where only one of the gaps is formed between the barrel 140 and the sensor case 225 or between the barrel 140 and the sensor unit 220, the thermal influence on the sensor unit 220 is further prevented.

The sensor unit 220 of the present embodiment is disposed at a position closer to the cooling unit 160 than the heating unit 170 described above. Specifically, the shortest distance between the sensor unit 220 and the cooling unit 160 is smaller than the shortest distance between the sensor unit 220 and the heating unit 170. Accordingly, the heat generated by the heating unit 170 is less likely to be transmitted to the sensor unit 220 as compared with a case where the sensor unit 220 is disposed closer to the heating unit 170 than the cooling unit 160, and since the sensor unit 220 is easily cooled by the cooling unit 160, the thermal influence of the heating unit 170 on the sensor unit 220 is further prevented. When the plasticizing unit 120 includes a plurality of cooling units 160 and a plurality of heating units 170, the shortest distance between the sensor unit 220 and a cooling unit 160 closest to the sensor unit 220 may be smaller than the shortest distance between the sensor unit 220 and a heating unit 170 closest to the sensor unit 220.

The sensor unit 220 of the present embodiment is implemented by a pressure sensor having a quartz crystal. The sensor unit 220 detects the pressure received by the sensor unit 220 as an electric signal by using a piezoelectric effect of the quartz crystal. The sensor unit 220 may be implemented by, for example, a pressure sensor having another piezoelectric element, a capacitance type pressure sensor, or the like.

The rod 201 receives the pressure of the plasticized material in the communication flow path 180 at the first end surface 203 thereof, and is urged toward the sensor unit 220 along the longitudinal direction. Accordingly, the second end surface 204 of the rod 201 is pressed against the sensor unit 220, and the pressure received by the rod 201 on the first end surface 203 is transmitted to the sensor unit 220 via the second end surface 204. Then, the sensor unit 220 detects the pressure transmitted via the rod 201. In this way, the pressure detection unit 200 detects the pressure of the plasticized material in the communication flow path 180 by the sensor unit 220 via the rod 201.

The support portion 230 is provided between the first cylinder 210 and the sensor unit 220 in the X direction. The support portion 230 has a rectangular parallelepiped shape, and is fixed to the barrel 140 via bolts from the +Y direction of the barrel 140. The support portion 230 is formed with a through hole 231 that penetrates the support portion 230 along the X direction and through which the rod 201 is inserted. The support portion 230 of the present embodiment slidably supports the rod 201 inserted through the through hole 231 with respect to the through hole 231.

As shown in FIG. 5, the material delivery device 115 includes a rotation regulation mechanism 240. The rotation regulation mechanism 240 includes a first engaging portion 241 provided on a side surface of the rod 201, and a second engaging portion 242 engaging the first engaging portion 241 in a circumferential direction of the rod 201. The rotation regulation mechanism 240 regulates the rotation of the rod 201 about a central axis RX by the engagement between the first engaging portion 241 and the second engaging portion 242. The central axis RX is a central axis along the longitudinal direction of the rod 201. In the present embodiment, the second engaging portion 242 is provided on the support portion 230 described above.

Figure 6:
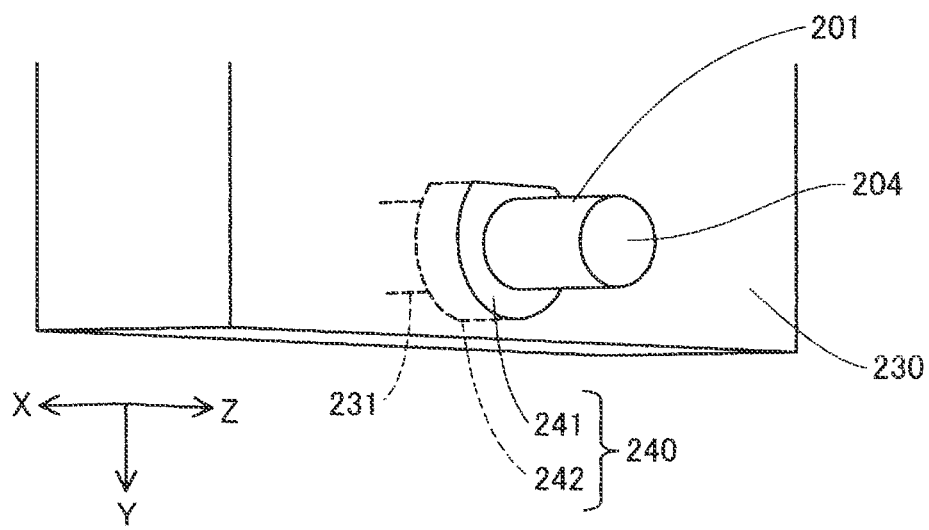
FIG. 6 is a perspective view showing a configuration of a rotation regulation mechanism according to the first embodiment.

FIG. 6 is a perspective view showing a configuration of the rotation regulation mechanism 240 according to the present embodiment. As shown in FIGS. 5 and 6, the first engaging portion 241 of the present embodiment has a protrusion portion protruding from the rod 201 in a direction intersecting the longitudinal direction of the rod 201. Specifically, the first engaging portion 241 is formed as a portion protruding from the rod 201 in all directions perpendicular to the longitudinal direction of the rod 201 at a middle portion in the longitudinal direction of the rod 201. That is, the first engaging portion 241 of the present embodiment is a flange-shaped portion formed in the middle of the rod 201 in the X direction. The first engaging portion 241 has a D-shape (the alphabet) when viewed along the X direction. That is, an outer edge of the first engaging portion 241 is implemented by an arc shape and a linear shape coupling both ends of the arc shape. In the present embodiment, for example, the first engaging portion 241 is easily formed by forming a flange portion having a circular cross section, and then cutting a part of the flange portion in a straight line such that the flange portion is formed as a D shape.

The second engaging portion 242 of the present embodiment engages with a protrusion portion of the first engaging portion 241 in the circumferential direction of the rod 201, and has a recess portion that opens toward the sensor unit 220 in the X direction. Specifically, the second engaging portion 242 is a recess into which the first engaging portion 241 can be fitted and which is formed so as to open toward the −X direction at an end portion of the through hole 231 provided in the supporting portion 230 in the −X direction. The second engaging portion 242 has a shape and dimensions corresponding to those of the first engaging portion 241. Therefore, an outer edge of the second engaging portion 242 has a D shape when viewed along the X direction, similarly to the first engaging portion 241.

As shown in FIGS. 5 and 6, the rod 201 is inserted into the through hole 231 of the support portion 230 and inserted into the first cylinder 210, whereby the first engaging portion 241 fits with the second engaging portion 242 from the −X direction. Accordingly, the second engaging portion 242 engages with the first engaging portion 241 in the circumferential direction of the rod 201, and the rotation of the rod 201 about the central axis RX is regulated. In the present embodiment, the first engaging portion 241 and the second engaging portion 242 have a D shape when viewed along the X direction, and since a friction between the first engaging portion 241 and the second engaging portion 242 is reduced in a portion where the two are formed in an arc shape when viewed along the X direction, a transmission of the pressure by the rod 201 is kept good, and the rotation of the rod 201 is regulated. Further, since the movement of the rod 201 in the +X direction is regulated because the first engaging portion 241 is fitted with the second engaging portion 242 from the −X direction, the rod 201 is prevented from protruding into the communication flow path 180.

Figure 7:
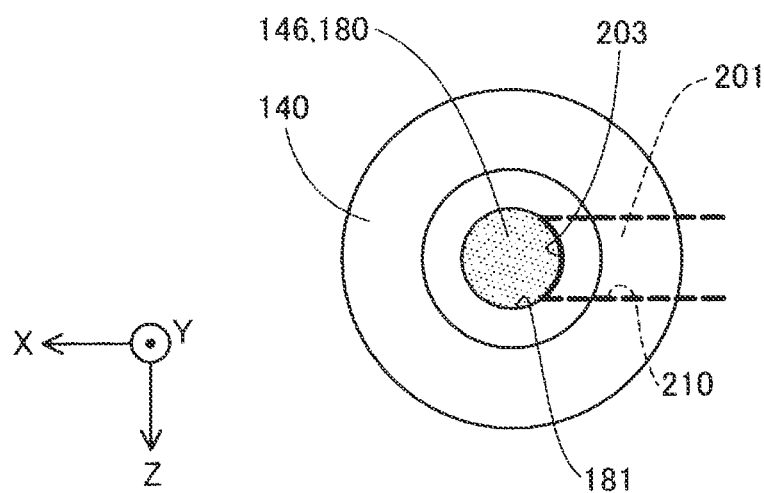
FIG. 7 is a plan view of a communication hole.

FIG. 7 is a plan view of the communication hole 146 when viewed from the +Y direction. In FIG. 7, members such as the nozzle 156, which are located in the +Y direction of the barrel 140, are omitted in order to facilitate understanding of the configuration. Further, in FIG. 7, the rod 201 and the first cylinder 210 are shown by thick lines, and parts of the rod 201 and the first cylinder 210 that overlap with the barrel 140 and cannot be seen are shown by broken lines. Further, in FIG. 7, a halftone dot pattern hatching is attached to the portion where the communication hole 146 is formed. As shown in FIG. 7, the first end surface 203 of the rod 201 has a shape along an inner wall surface 181 of the communication flow path 180 to which the first cylinder 210 is coupled. Specifically, the inner wall surface 181 has a curved surface shape that forms a part of a side surface of the communication flow path 180 having a cylindrical shape, and the first end surface 203 has a curved surface shape, which forms a part of the side surface having the cylindrical shape, along the inner wall surface 181. Therefore, when viewed along the communication flow path 180, that is, along the Y direction, the communication flow path 180 has a circular shape, and the first end surface 203 has an arc shape corresponding to a part of the circumference of the communication flow path 180. Further, in the present embodiment, the first end surface 203 and the inner wall surface 181 are located on the same plane.

Figure 8:
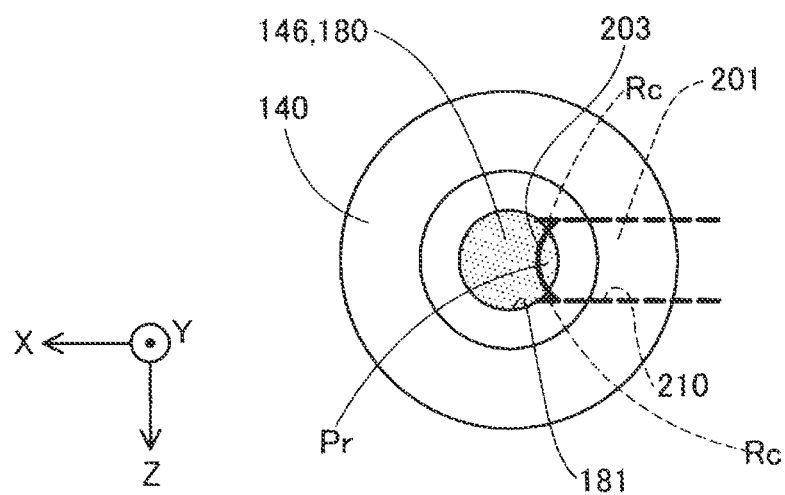
FIG. 8 is a diagram showing rotation of a rod.

FIG. 8 is a diagram showing the rotation of the rod 201. FIG. 8 is a plan view of the communication hole 146 when viewed from the +Y direction, as in FIG. 7. FIG. 8 shows a state where the rod 201 is rotated by 90° about the central axis RX from a state shown in FIG. 7. In the state shown in FIG. 8, unlike the state shown in FIG. 7, a protruding portion Pr, in which the rod 201 protrudes into the communication flow path 180, and a retracting portion Rc, in which the rod 201 retracts in the −X direction with respect to the inner wall surface 181, are formed. Therefore, in the state shown in FIG. 8, the possibility that the protruding portion Pr obstructs the flow of the plasticized material in the communication flow path 180 and the possibility that the plasticized material retains in the retracting portion Rc increase. For example, when the rotation regulation mechanism 240 is not provided, the rotation of the rod 201 as shown in FIG. 8 occurs due to the first end surface 203 receiving a force from the plasticized material flowing in the communication flow path 180 in a direction intersecting the first end surface 203. In the present embodiment, since the rotation regulation mechanism 240 is provided, such rotation of the rod 201 is prevented. For example, when the material delivery device 115 and the injection molding device 100 are manufactured, the rotation regulation mechanism 240 can also prevent the rod 201 from being disposed in a pre-rotated state as shown in FIG. 8.

The material delivery device 115 of the present embodiment described above includes the rotation regulation mechanism 240 that regulates the rotation of rod 201 about the central axis RX by the engagement between the first engaging portion 241 provided on the side surface of the rod 201 and the second engaging portion 242 to be engaged with the first engaging portion 241. Accordingly, the rotation of the rod 201 is regulated by the rotation regulation mechanism 240. Therefore, the rod 201 reduces the possibility that the flow of the plasticized material in the communication flow path 180 is obstructed.

Further, in the present embodiment, the first engaging portion 241 has the protrusion portion protruding in the direction intersecting the X direction, and the second engaging portion 242 has the recess portion that opens in the −X direction. By fitting the protrusion portion of the first engaging portion 241 into the recess portion of the second engaging portion 242, the first engaging portion 241 and the second engaging portion 242 are engaged with each other. Therefore, with a simple configuration, the rotation of the rod 201 can be regulated, and the pressure of the plasticized material in the communication flow path 180 can be transmitted to the sensor unit 220 via the rod 201.

Further, in the present embodiment, the second engaging portion 242 is provided on the support portion 230. Therefore, while the rod 201 is supported in the middle in an axial direction by the support portion 230, the rotation of the rod 201 is regulated by the engagement between the first engaging portion 241 provided on the rod 201 and the second engaging portion 242 provided on the support portion 230.

Further, in the present embodiment, the first end surface 203 has a shape along the inner wall surface 181 to which the first cylinder 210 of the communication flow path 180 is coupled. Accordingly, as compared with a case where the first end surface 203 is not shaped along the inner wall surface 181 but is, for example, a surface parallel to the Y direction and the Z direction, the possibility that a part of the rod 201 protrudes into the communication flow path 180 and obstructs the flow of the plasticized material, and the possibility that the plasticized material retains in the portion where the rod 201 retracts in the −X direction with respect to the inner wall surface 181 are reduced. Therefore, the quantity and the quality of the plasticized material delivered from the nozzle 156 are stable.

Further, in the present embodiment, the communication flow path 180 has a circular shape when viewed along the communication flow path 180, and the first end surface 203 has an arc shape corresponding to a part of the circumference of the communication flow path 180 when viewed along the communication flow path 180. Therefore, the flow of the plasticized material in the communication flow path 180 tends to be smooth.

Further, in the present embodiment, the first end surface 203 and the inner wall surface 181 are located on the same plane. Therefore, the possibility that a part of the rod 201 protrudes into the communication flow path 180 and obstructs the flow of the plasticized material, and the possibility that the plasticized material retains in the portion where the rod 201 retracts in the −X direction with respect to the inner wall surface 181 are further reduced.

Further, in the present embodiment, the screw 130 has the groove forming surface 132 in which a groove is formed, the plasticizing unit 120 has the barrel 140 provided with the communication hole 146 forming at least a part of the communication flow path 180, and the first cylinder 210 is coupled to the communication hole 146. Therefore, the plasticizing unit 120 can be miniaturized, and the first cylinder 210 can be disposed in the barrel 140, so that the entire material delivery device 115 can be miniaturized.

Further, in the present embodiment, the sensor unit 220 is disposed at a position closer to the cooling unit 160 than the heating unit 170. Accordingly, the thermal influence due to the heating unit 170 on the sensor unit 220 is prevented. Therefore, the pressure detection accuracy of the sensor unit 220 is improved.

Further, according to the injection molding device 100 of the present embodiment, the second cylinder 251 is coupled upstream of the coupling portion between the communication flow path 180 and the first cylinder 210 in the communication flow path 180. Accordingly, since the first cylinder 210 and the rod 201 are located downstream of the coupling portion between the communication flow path 180 and the second cylinder 251 in the communication flow path 180, the pressure detection unit 200 can more accurately detect the pressure of the plasticized material supplied from the second cylinder 251 to the nozzle 156 in a part of the communication flow path 180 between the second cylinder 251 and the nozzle 156. Therefore, the injection accuracy of the plasticized material is improved, and the strength and the quality of the molded product are improved.

B. Second Embodiment

Figure 9:
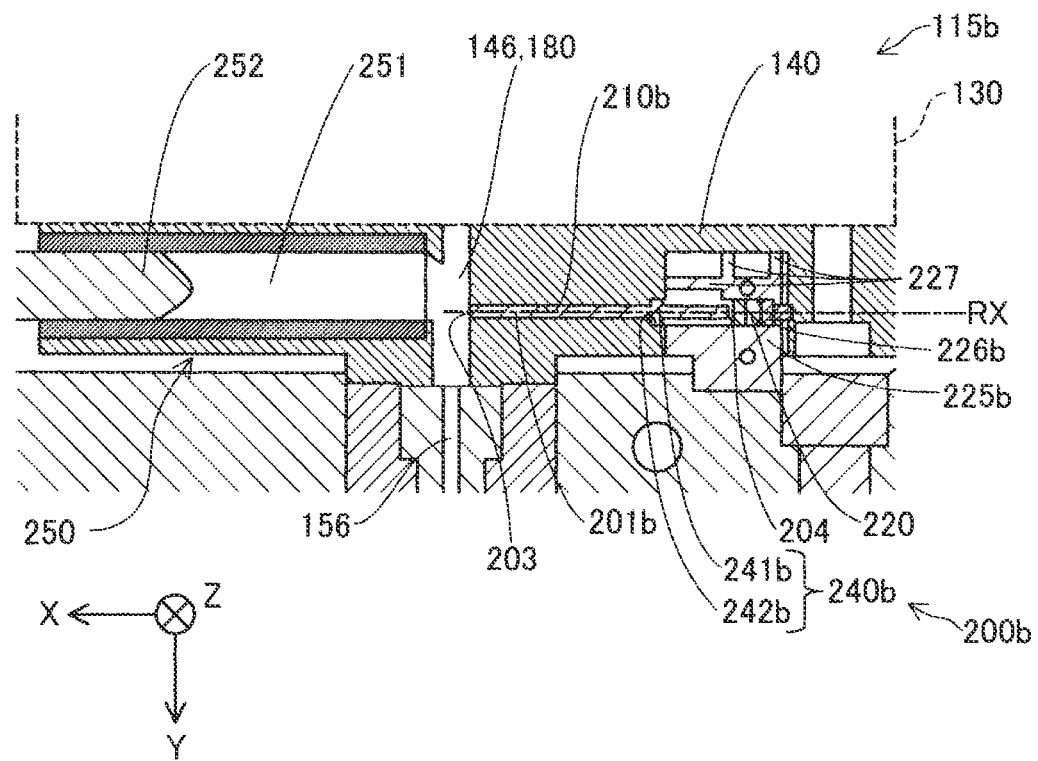
FIG. 9 is a diagram showing a schematic configuration of a pressure detection unit according to a second embodiment.

FIG. 9 is a diagram showing a schematic configuration of a pressure detection unit 200b in a material delivery device 115b according to a second embodiment. Unlike the first embodiment, a second engaging portion 242b of a rotation regulation mechanism 240b of the present embodiment is provided on a first cylinder 210b. Further, the pressure detection unit 200b does not include the support portion 230. Of the configurations of the material delivery device 115b and the injection molding device 100 according to the second embodiment, points not particularly described are the same as those of the first embodiment.

In the present embodiment, a sensor case 225b is disposed below the barrel 140 and fixed to the barrel 140 by bolts (not shown). The sensor case 225b has a plurality of leg portions 227 in addition to a sensor holding portion 226b that holds the sensor unit 220. The leg portions 227 are provided between the sensor holding portion 226b and the barrel 140. A space is formed between the leg portions 227, and the sensor case 225b and the barrel 140 are disposed via the space formed between the leg portions 227. Therefore, the thermal influence due to the heating unit 170 on the sensor unit 220 is prevented.

Figure 10:
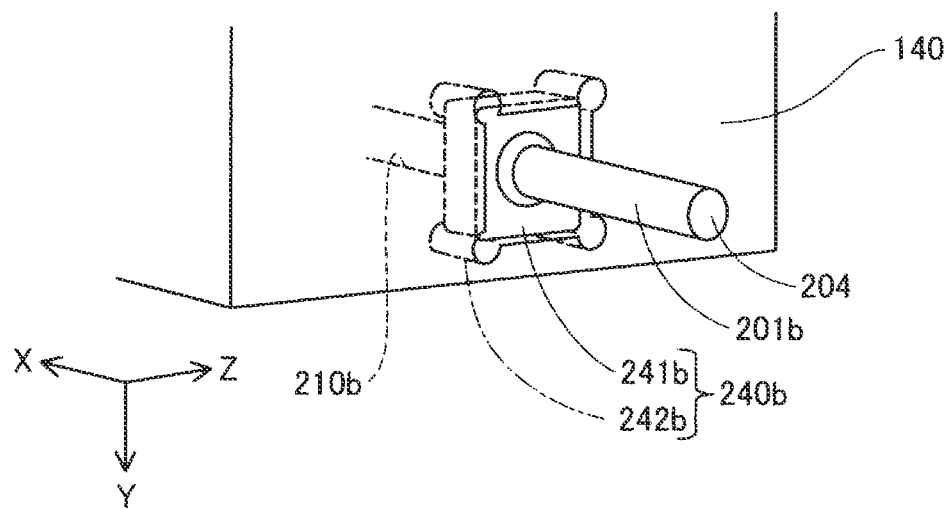
FIG. 10 is a perspective view showing a configuration of a rotation regulation mechanism according to the second embodiment.

FIG. 10 is a perspective view showing a configuration of the rotation regulation mechanism 240b. A first engaging portion 241b is a flange-shaped portion formed in a middle portion of a rod 201b in the X direction, as in the first embodiment. Unlike the first embodiment, the first engaging portion 241b has a flat rectangular parallelepiped shape whose dimension in the X direction is small. Therefore, the first engaging portion 241b has a quadrangular shape when viewed along the X direction.

Similar to the first embodiment, the second engaging portion 242b of the present embodiment engages with a protrusion portion of the first engaging portion 241b in a circumferential direction of the rod 201b, and has a recess portion that opens toward the sensor unit 220 in the X direction. Specifically, the second engaging portion 242b is a recess with which the first engaging portion 241b can be engaged and which is formed so as to open toward the −X direction at an end portion of the first cylinder 210b in the −X direction. The second engaging portion 242b has a shape and dimensions corresponding to those of the first engaging portion 241b, and is formed such that the first engaging portion 241b can be fitted. Therefore, the second engaging portion 242b is formed in a rectangular parallelepiped shape like the first engaging portion 241b, and has a quadrangular shape when viewed along the X direction.

In the present embodiment, the rod 201b is inserted into the first cylinder 210b, and therefore, the first engaging portion 241b fits with the second engaging portion 242b from the −X direction. Here, as described above, since the first engaging portion 241b and the second engaging portion 242b have the quadrangular shape when viewed along the X direction, the rod 201b is regulated from rotating about the central axis RX. Further, since the second engaging portion 242b opens in the −X direction, pressure transmission to the sensor unit 220 via the rod 201b is permitted as in the first embodiment. Further, since the movement of the rod 201b toward the +X direction is regulated because the first engaging portion 241b is fitted with the second engaging portion 242b from the −X direction, the rod 201b is prevented from protruding into the communication flow path 180 as in the first embodiment.

In the material delivery device 115b according to the present embodiment described above, the rotation of the rod 201b is also regulated by the rotation regulation mechanism 240b, and the possibility that the rod 201b obstructs the flow of the plasticized material in the communication flow path 180 is reduced. In particular, in the present embodiment, the second engaging portion 242b is provided on the first cylinder 210b. Therefore, the rotation of the rod 201b can be regulated even when a member having a portion to be engaged with the first engaging portion 241b is not provided separately from the rod 201b and the first cylinder 210b.

C. Third Embodiment

Figure 11:
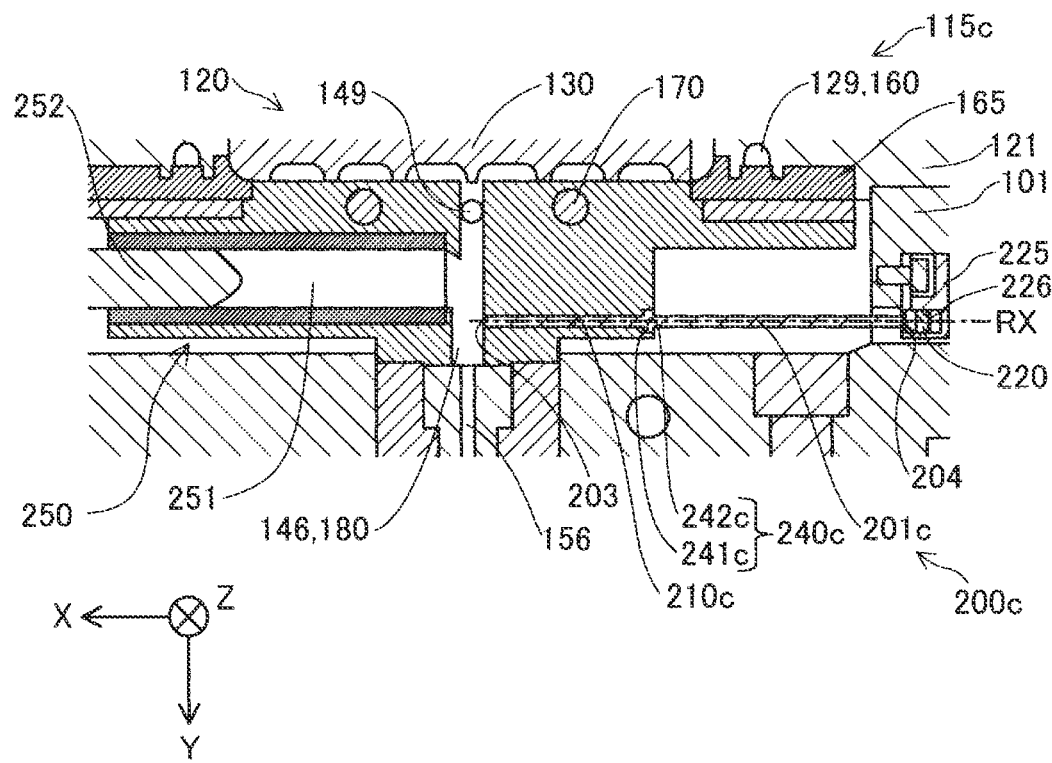
FIG. 11 is a diagram showing a schematic configuration of a pressure detection unit according to a third embodiment.

FIG. 11 is a diagram showing a schematic configuration of a pressure detection unit 200c in a material delivery device 115c according to a third embodiment. A rotation regulation mechanism 240c of the present embodiment is provided at a position closer to the first end surface 203 than the second end surface 204 in the X direction, which is a longitudinal direction of a rod 201c. Of the configurations of the material delivery device 115c and the injection molding device 100 according to the third embodiment, points not particularly described are the same as those of the second embodiment.

The sensor case 225 of the present embodiment is fixed to the side surface portion 101 as in the first embodiment. Further, a second engaging portion 242c is provided at an end portion of a first cylinder 210c in the −X direction, as in the second embodiment. On the other hand, the first cylinder 210c of the present embodiment has a smaller dimension in the X direction than that of the first cylinder 210b of the second embodiment. Therefore, the second engaging portion 242c is provided at a position in the +X direction closer to the communication flow path 180 as compared with the second engaging portion 242b of the second embodiment. Further, a first engaging portion 241c provided on the rod 201c also corresponds to the second engaging portion 242c, and is provided at a position in the +X direction closer to the communication flow path 180 as compared with the first engaging portion 241b of the second embodiment. Accordingly, the rotation regulation mechanism 240c of the present embodiment is located at a position closer to the first end surface 203 than the second end surface 204 in the X direction. That is, the shortest distance between the rotation regulation mechanism 240c and the first end surface 203 is smaller than the shortest distance between the rotation regulation mechanism 240c and the second end surface 204.

In the material delivery device 115c according to the third embodiment described above, the rotation of the rod 201c is also regulated by the rotation regulation mechanism 240c, and the possibility that the rod 201c obstructs the flow of the plasticized material in the communication flow path 180 is reduced. In particular, in the present embodiment, the rotation regulation mechanism 240c is provided at a position closer to the communication flow path 180 than the sensor unit 220 in the X direction. Therefore, as compared with a case where the rotation regulation mechanism 240c is provided at a position closer to the second end surface 204 than the first end surface 203 in the X direction, a distance between the first end surface 203 of the rod 201c and the rotation regulation mechanism 240c is reduced. Therefore, when the first end surface 203 receives a force in a direction intersecting the first end surface 203 from the plasticized material flowing in the communication flow path 180, twist of the rod 201c that occurs between the first end surface 203 and the rotation regulation mechanism 240c is prevented.

D. Fourth Embodiment

Figure 12:
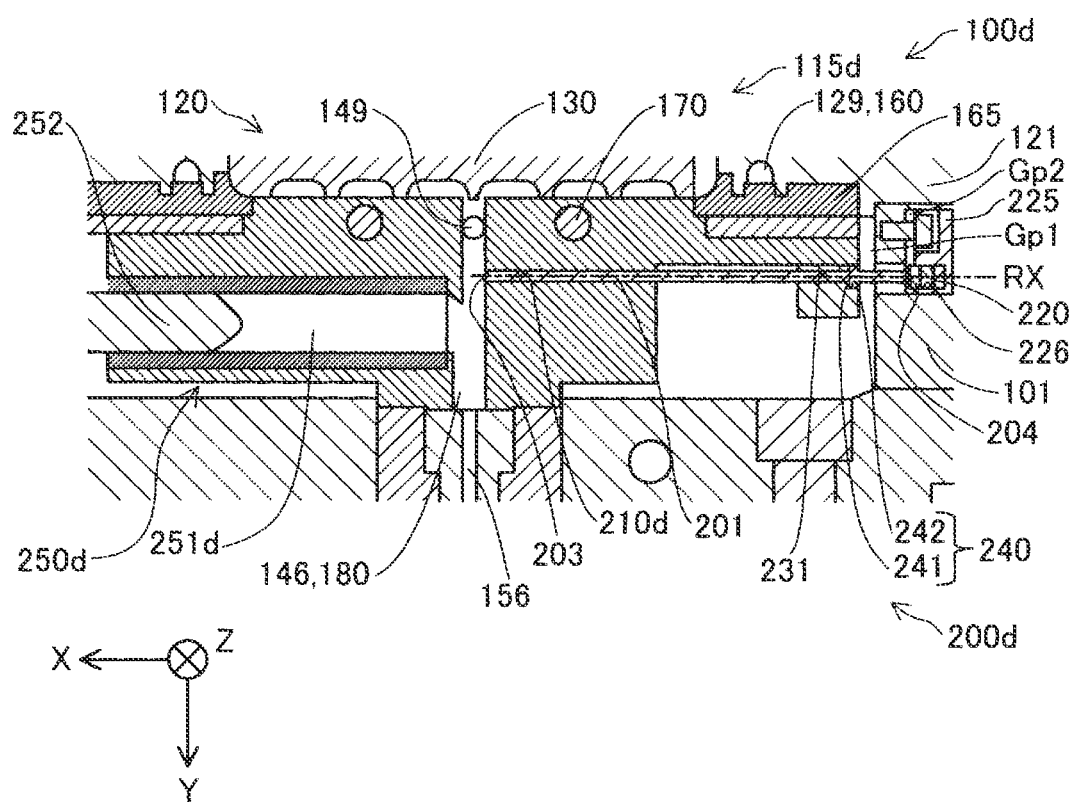
FIG. 12 is a diagram showing a schematic configuration of a pressure detection unit according to a fourth embodiment.

FIG. 12 is a diagram showing a schematic configuration of a pressure detection unit 200d in an injection molding device 100d according to a fourth embodiment. Unlike the first embodiment, a second cylinder 251d of an injection control unit 250d according to the present embodiment is coupled downstream of a coupling portion between the communication flow path 180 and a first cylinder 210d in the communication flow path 180. That is, the first cylinder 210d and the rod 201 are located upstream of a coupling portion between the communication flow path 180 and the second cylinder 251d in the communication flow path 180. Of the configurations of a material delivery device 115d and the injection molding device 100d according to the fourth embodiment, points not particularly described are the same as those of the first embodiment.

In the injection molding device 100d according to the fourth embodiment described above, the rotation of the rod 201 is also regulated by the rotation regulation mechanism 240, and the possibility that the rod 201 obstructs the flow of the plasticized material in the communication flow path 180 is reduced. In particular, in the present embodiment, the second cylinder 251d is coupled downstream of a coupling portion between the communication flow path 180 and the first cylinder 210d in the communication flow path 180. Accordingly, since the first cylinder 210d and the rod 201 are located upstream of the coupling portion between the communication flow path 180 and the second cylinder 251d in the communication flow path 180, the pressure detection unit 200d can more accurately detect the pressure of the plasticized material flowing from the plasticizing unit 120 into the second cylinder 251d in a part of the communication flow path 180 between the second cylinder 251d and the plasticizing unit 120. Therefore, the weighing accuracy of the plasticized material is improved, and the strength and the quality of the molded product are improved.

E. Fifth Embodiment

Figure 13:
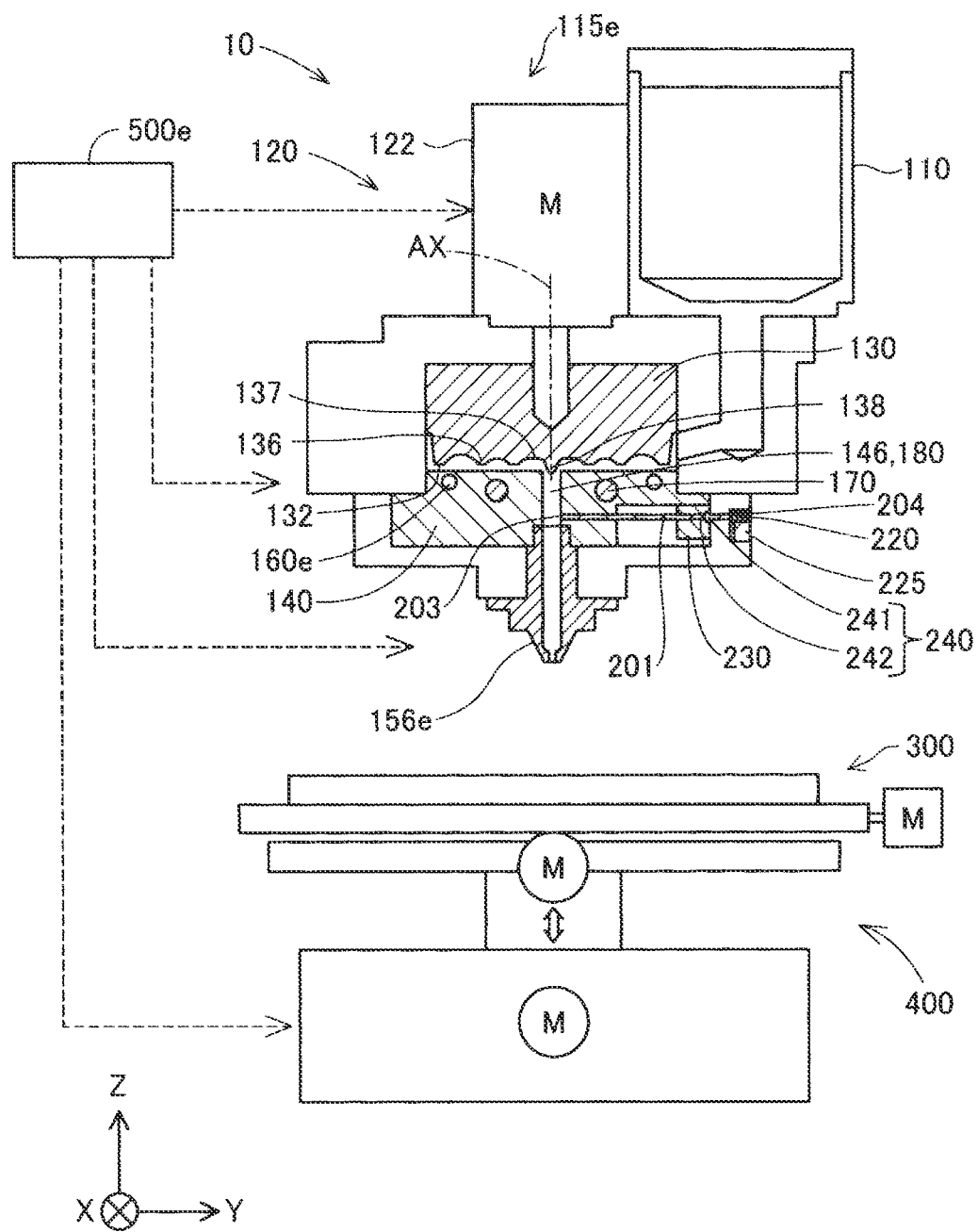
FIG. 13 is a diagram showing a schematic configuration of a three-dimensional shaping device as a fifth embodiment.

FIG. 13 is a diagram showing a schematic configuration of a three-dimensional shaping device 10 as a fifth embodiment. The three-dimensional shaping device 10 includes the material supply unit 110, a material delivery device 115e, a stage 300, a moving mechanism 400, and a control unit 500e. The material delivery device 115e includes the plasticizing unit 120, a nozzle 156e, and the pressure detection unit 200. In the three-dimensional shaping device 10, a material supplied from the material supply unit 110 is plasticized by the plasticizing unit 120 of the material delivery device 115e to generate a plasticized material, and the generated plasticized material is delivered from the nozzle 156e to the outside of the material delivery device 115e. The plasticized material delivered through the nozzle 156e is deposited on the stage 300. Delivering of the plasticized material toward the stage 300 through the nozzle 156e is sometimes referred to as "discharging of the plasticized material".

The moving mechanism 400 is configured such that relative positions of the nozzle 156e and the stage 300 can be changed. In the present embodiment, the moving mechanism 400 moves the stage 300 without moving the nozzle 156e. The moving mechanism 400 is implemented by a three-axis positioner that moves the stage 300 in three-axis directions of the X, Y, and Z directions by drive forces of three motors. The moving mechanism 400 is controlled by the control unit 500e. In another embodiment, the relative position of the nozzle 156e and the stage 300 may be changed by moving the nozzle 156e without moving the stage 300. Further, the moving mechanism 400 may move both the nozzle 156e and the stage 300.

Similar to the control unit 500, the control unit 500e is implemented by a computer or the like. The control unit 500e controls the moving mechanism 400 and the plasticizing unit 120 according to shaping data acquired in advance, and shapes a three-dimensional shaping object by discharging the plasticized material from the nozzle 156e to any position on the stage 300. Processing for shaping the three-dimensional shaping object executed by the control unit 500e is sometimes called three-dimensional shaping processing.

The plasticizing unit 120 includes the drive motor 122, the screw 130, the barrel 140, a cooling unit 160e, and the heating unit 170. Similar to the first embodiment, the plasticizing unit 120 heats the material while transporting the material toward the communication hole 146 by the rotation of the screw 130 and the heating of the heating unit 170 to plasticize the material, and discharges the material from the communication hole 146. The plasticized material discharged from the communication hole 146 is supplied to the nozzle 156e. Similar to the first embodiment, the communication hole 146 forms the entire communication flow path 180. Further, unlike the first embodiment, the cooling unit 160e of the present embodiment is provided as a refrigerant flow path formed in the outer peripheral portion of the barrel 140 along the circumferential direction of the screw 130.

Similar to the first embodiment, the first cylinder 210 of the pressure detection unit 200 is coupled to the communication hole 146. Similar to the first embodiment, the pressure detection unit 200 detects the pressure of the plasticized material in the communication flow path 180 by the sensor unit 220 via the rod 201. The control unit 500e can control the plasticizing unit 120 or the like based on the pressure of the plasticized material in the communication flow path 180 detected by the pressure detection unit 200 in the three-dimensional shaping processing. For example, the control unit 500e can stabilize a generated amount of the plasticized material in the plasticizing unit 120 by adjusting the rotation speed of the drive motor 122, the output of the cooling unit 160, the output of the heating unit 170, or the like based on the pressure detected by the pressure detection unit 200. Accordingly, since the generated amount of the plasticized material discharged from the nozzle 156e toward the stage 300 is stabilized, a quality of a shaping material is improved. Further, the control unit 500 may stabilize the amount of the plasticized material deposited on the stage 300 by, for example, adjusting the driving of the moving mechanism 400 based on the pressure detected by the pressure detection unit 200.

According to the three-dimensional shaping device 10 of the fifth embodiment described above, the material delivery device 115 including the rotation regulation mechanism 240 is provided as in the first embodiment. Accordingly, the rotation of the rod 201 is regulated by the rotation regulation mechanism 240. Therefore, the rod 201 reduces the possibility that the flow of the plasticized material in the communication flow path 180 is obstructed.

F. Other Embodiments (F-1) In the above embodiments, the first engaging portion 241 is formed as a flange-shaped portion of the rod 201, and the second engaging portion 242 is formed as a recess that can be fitted with the first engaging portion 241. On the other hand, the first engaging portion 241 and the second engaging portion 242 may be formed in other shapes. For example, the first engaging portion 241 may be formed as a protrusion portion protruding from the rod 201 to one direction intersecting the longitudinal direction of the rod 201, and the second engaging portion may be formed as a recess portion that engages with the protrusion portion. Further, the first engaging portion 241 may be formed as a recess portion recessed in a direction intersecting the longitudinal direction of the rod 201, and the second engaging portion may be formed as a protrusion portion that engages with the recess portion. Further, the first engaging portion 241 may be formed as a shape in which irregularities are combined, and the second engaging portion 242 may be formed as irregularities that engage with the irregularities of the first engaging portion 241. Further, the first engaging portion 241 may not be integrally formed with the rod 201, for example, the first engaging portion 241 may be formed by fixing a member that engages with the second engaging portion 242 to the rod 201 by adhesion, welding, or the like via an adhesive.

(F-2) In the above embodiments, when viewed along the communication flow path 180, the communication flow path 180 has a circular shape, and the first end surface 203 has an arc shape. On the other hand, when viewed along the communication flow path 180, the communication flow path 180 and the first end surface 203 may have other shapes. Further, the first end surface 203 may not have a shape along the inner wall surface 181 of the first cylinder 210.

(F-3) In the above embodiments, the first end surface 203 and the inner wall surface 181 are located on the same plane. On the other hand, in a state where no pressure is applied to the first end surface 203, the first end surface 203 and the inner wall surface 181 may not be located on the same plane. For example, in a state where no pressure is applied to the first end surface 203, the first end surface 203 and the inner wall surface 181 are located on the same plane, and in a state where a pressure is applied to the first end surface 203, the first end surface 203 and the inner wall surface 181 may not be located on the same plane. Further, in both the state where the pressure is applied to the first end surface 203 and the state where no pressure is applied to the first end surface 203, the first end surface 203 and the inner wall surface 181 may not be located on the same plane.

(F-4) In the above embodiments, the rod 201 is disposed adjacent to the sensor unit 220 without having a gap between the rod 201 and the sensor unit 220. On the other hand, the rod 201 may be disposed not adjacent to the sensor unit 220 in a state where no pressure is applied to the first end surface 203. In this case, for example, the rod 201 may be disposed with a gap between the rod 201 and the sensor unit 220 in a state where no pressure is applied to the first end surface 203. Even in such an aspect, when the rod 201 receives the pressure of the plasticized material in the communication flow path 180 on the first end surface 203, the rod 201 is urged in the −X direction, moves toward the −X direction, and comes into contact with the sensor unit 220, and therefore, the pressure can be transmitted to the sensor unit 220. In this case, the first engaging portion 241 and the second engaging portion 242 are configured such that the engagement between the first engaging portion 241 and the second engaging portion 242 is not released by the movement of the rod 201 toward the −X direction. For example, the dimension of the second engaging portion 242 in the X direction is configured to be larger than a distance between the rod 201 and the sensor unit 220. Further, for example, an elastic member such as a spring for urging the rod 201 toward the communication flow path 180 may be provided on the second end surface 204 of the rod 201, and the second end surface 204 and the sensor unit 220 may be disposed so as to sandwich the elastic member. In this case, in a state where no pressure is applied to the first end surface 203, the first end surface 203 and the inner wall surface 181 may be configured to be located on the same plane by an urging force of the elastic member that urges the rod 201. Even in such an aspect, the rod 201 can transmit pressure to the sensor unit 220 via the second end surface 204 and the elastic member.

(F-5) In the above embodiments, the screw 130 is a flat screw. On the other hand, the screw 130 may be other screws instead of the flat screw. For example, the screw 130 may be an in-line screw that is rotated by the drive force of a motor. In this case, the plasticizing unit 120 may not include the barrel 140.

(F-6) In the above embodiments, the communication hole 146 forms the entire communication flow path 180. On the other hand, the communication hole 146 may not form the entire communication flow path 180. The communication flow path 180 may be formed by, for example, the communication hole 146 and another flow path that communicates with the communication hole 146. In this case, the first cylinder 210 and the second cylinder 251 may be coupled to the other flow path instead of the communication hole 146 of the communication flow path 180. Further, for example, when the plasticizing unit 120 does not include the barrel 140, the communication flow path 180 may not be formed by the communication hole 146.

(F-7) In the above embodiments, the sensor unit 220 is disposed at a position closer to the cooling unit 160 than the heating unit 170. On the other hand, the sensor unit 220 may not be disposed at a position closer to the cooling unit 160 than the heating unit 170. In this case, the shortest distance between the sensor unit 220 and the heating unit 170 may be smaller than the shortest distance between the sensor unit 220 and the cooling unit 160, or the shortest distances may be equal. Further, the plasticizing unit 120 may not include the cooling unit 160.

G. Other Aspects

The present disclosure is not limited to the embodiments described above, and can be implemented in various forms without departing from the scope of the present disclosure. For example, the present disclosure can be implemented by the following aspects. In order to solve some or all of problems of the present disclosure, or to achieve some or all of effects of the present disclosure, technical characteristics in the above embodiments corresponding to technical characteristics in aspects described below can be replaced or combined as appropriate. Further, the technical characteristics can be deleted as appropriate unless the technical characteristics are described as essential in the present specification.

(1) According to a first aspect of the present disclosure, a material delivery device is provided. The material delivery device includes: a plasticizing unit including a screw and configured to plasticize a material by rotation of the screw to produce a plasticized material; a nozzle through which the plasticized material is delivered to outside; a communication flow path provided between the screw and the nozzle and through which the plasticized material flows; a pressure detection unit including a first cylinder coupled to the communication flow path, a rod inserted into the first cylinder, and a pressure sensor disposed with the rod separated from the communication flow path, in which the rod has a first end surface facing the communication flow path and a second end surface opposite to the first end surface in a longitudinal direction of the rod, and configured to receive a pressure of the plasticized material in the communication flow path at the first end surface and transmit the pressure to the pressure sensor through the second end surface; and a rotation regulation mechanism having a first engaging portion provided on a side surface of the rod and a second engaging portion to be engaged with the first engaging portion, and configured to regulate rotation of the rod about a central axis along the longitudinal direction of the rod by engaging the first engaging portion with the second engaging portion.

According to such an aspect, the rotation of the rod is regulated by the rotation regulation mechanism. Therefore, the rod reduces the possibility that the flow of the plasticized material in the communication flow path is obstructed.

(2) In the material delivery device according to the above aspect, the rotation regulation mechanism may be provided at a position closer to the first end surface than the second end surface in the longitudinal direction. According to such an aspect, twist of the rod is prevented when the first end surface receives a force in a direction intersecting the first end surface from the plasticized material flowing in the communication flow path.

(3) In the material delivery device according to the above aspect, the first engaging portion may have a protrusion portion protruding from the rod in a direction intersecting the longitudinal direction, the second engaging portion may have a recess portion opening toward the pressure sensor in the longitudinal direction, and the first engaging portion and the second engaging portion may be engaged with each other by fitting the protrusion portion into the recess portion. According to such an aspect, with a simple configuration, the rotation of the rod can be regulated, and the pressure of the plasticized material in the communication flow path can be transmitted to the sensor unit via the rod.

(4) The material delivery device according to the above aspect may further include a support portion supporting the rod between the first cylinder and the pressure sensor in the longitudinal direction, in which the second engaging portion may be provided on the support portion. According to such an aspect, while the rod is supported in the middle in an axial direction by the support portion, the rotation of the rod is regulated by the engagement between the first engaging portion provided on the rod and the second engaging portion provided on the support portion.

(5) In the material delivery device according to the above aspect, the second engaging portion may be provided on the first cylinder. According to such an aspect, the rotation of the rod can be regulated even when a member having a portion to be engaged with the first engaging portion is not provided separately from the rod and the first cylinder.

(6) In the material delivery device according to the above aspect, the first end surface may have a shape along an inner wall surface to which the first cylinder of the communication flow path is coupled. According to such an aspect, the possibility that a part of the rod protrudes into the communication flow path and obstructs the flow of the plasticized material, and the possibility that the plasticized material retains in a portion where the rod retracts with respect to the inner wall surface are reduced. Therefore, the quantity and the quality of the plasticized material delivered from the nozzle are stable.

(7) In the material delivery device according to the above aspect, the communication flow path may have a circular shape when viewed along the communication flow path, and the first end surface may have an arc shape corresponding to a part of a circumference of the communication flow path when viewed along the communication flow path. According to such an aspect, the flow of the plasticized material in the communication flow path tends to be smooth.

(8) In the material delivery device according to the above aspect, the first end surface and the inner wall surface may be located on the same plane in a state where the pressure is not applied to the first end surface. According to such an aspect, the possibility that a part of the rod protrudes into the communication flow path and obstructs the flow of the plasticized material, and the possibility that the plasticized material retains in a portion where the rod retracts with respect to the inner wall surface are further reduced.

(9) In the material delivery device of the above aspect, the screw may have a groove forming surface on which a groove is formed, the plasticizing unit may have a barrel having a facing surface facing the groove forming surface, the barrel may be provided with a communication hole forming at least a part of the communication flow path, and the first cylinder may be coupled to the communication hole. According to such an aspect, the plasticizing unit can be miniaturized, and the first cylinder can be disposed in the barrel, so that the entire material delivery device can be miniaturized.

(10) In the material delivery device according to the above aspect, the plasticizing unit may include: a cooling unit configured to cool a region of the plasticizing unit that is closer to an outer peripheral portion of the barrel than the communication hole in a direction along the groove forming surface; and a heating unit configured to heat a material supplied between the barrel and the screw, and the pressure sensor may be disposed at a position closer to the cooling unit than the heating unit. According to such an aspect, the thermal influence due to the heating unit on the sensor unit is prevented. Therefore, the pressure detection accuracy of the sensor unit is improved.

(11) According to a second aspect of the present disclosure, a three-dimensional shaping device is provided. The three-dimensional shaping device includes: the material delivery device according to the first aspect; and a stage on which the plasticized material delivered from the nozzle is deposited.

According to such an aspect, the rotation of the rod is regulated by the rotation regulation mechanism. Therefore, the rod reduces the possibility that the flow of the plasticized material in the communication flow path is obstructed.

(12) According to a third aspect of the present disclosure, an injection molding device is provided. The injection molding device includes: the material delivery device according to the first aspect; an injection control unit having a second cylinder coupled to the communication flow path and a plunger moving in the second cylinder, and configured to weigh the plasticized material in the second cylinder and deliver the weighed plasticized material toward the nozzle; and a mold to which the plasticized material from the nozzle is delivered.

According to such an aspect, the rotation of the rod is regulated by the rotation regulation mechanism. Therefore, the rod reduces the possibility that the flow of the plasticized material in the communication flow path is obstructed.

(13) In the injection molding device according to the above aspect, the second cylinder may be coupled upstream of a coupling portion between the communication flow path and the first cylinder in the communication flow path. According to such an aspect, the pressure detection unit can more accurately detect the pressure of the plasticized material supplied from the second cylinder to the nozzle in a part of the communication flow path between the second cylinder and the nozzle. Therefore, the injection accuracy of the plasticized material is improved, and the strength and the quality of the molded product are improved.

(14) In the injection molding device according to the above aspect, the second cylinder may be coupled downstream of a coupling portion between the communication flow path and the first cylinder in the communication flow path. According to such an aspect, the pressure detection unit can more accurately detect the pressure of the plasticized material flowing from the plasticizing unit into the second cylinder in a part of the communication flow path between the second cylinder and the plasticizing unit. Therefore, the weighing accuracy of the plasticized material is improved, and the strength and the quality of the molded product are improved.

What is claimed is:

1. A material delivery device, comprising:
a plasticizing unit including a screw and configured to plasticize a material by rotation of the screw to produce a plasticized material;
a nozzle through which the plasticized material is delivered to outside;
a communication flow path provided between the screw and the nozzle and through which the plasticized material flows;
a pressure detection unit including a first cylinder coupled to the communication flow path, a rod inserted into the first cylinder, and a pressure sensor disposed with the rod separated from the communication flow path, in which the rod has a first end surface facing the communication flow path and a second end surface opposite to the first end surface in a longitudinal direction of the rod, and configured to receive a pressure of the plasticized material in the communication flow path at the first end surface and transmit the pressure to the pressure sensor through the second end surface; and
a rotation regulation mechanism having a first engaging portion provided on a side surface of the rod and a second engaging portion to be engaged with the first engaging portion, and configured to regulate rotation of the rod about a central axis along the longitudinal direction of the rod by engaging the first engaging portion with the second engaging portion.

2. The material delivery device according to claim 1, wherein
the rotation regulation mechanism is provided at a position closer to the first end surface than the second end surface in the longitudinal direction.

3. The material delivery device according to claim 1, wherein
the first engaging portion has a protrusion portion protruding from the rod in a direction intersecting the longitudinal direction,
the second engaging portion has a recess portion opening toward the pressure sensor in the longitudinal direction, and
the first engaging portion and the second engaging portion are engaged with each other by fitting the protrusion portion into the recess portion.

4. The material delivery device according to claim 1, further comprising:
a support portion supporting the rod between the first cylinder and the pressure sensor in the longitudinal direction, wherein
the second engaging portion is provided on the support portion.

5. The material delivery device according to claim 1, wherein
the second engaging portion is provided on the first cylinder.

6. The material delivery device according to claim 1, wherein
the first end surface has a shape along an inner wall surface to which the first cylinder of the communication flow path is coupled.

7. The material delivery device according to claim 6, wherein
the communication flow path has a circular shape when viewed along the communication flow path, and the first end surface has an arc shape corresponding to a part of a circumference of the communication flow path when viewed along the communication flow path.

8. The material delivery device according to claim 6, wherein
the first end surface and the inner wall surface are located on the same plane in a state where the pressure is not applied to the first end surface.

9. The material delivery device according to claim 1, wherein
the screw has a groove forming surface on which a groove is formed,
the plasticizing unit has a barrel having a facing surface facing the groove forming surface,
the barrel is provided with a communication hole forming at least a part of the communication flow path, and
the first cylinder is coupled to the communication hole.

10. The material delivery device according to claim 9, wherein
the plasticizing unit includes:
a cooling unit configured to cool a region of the plasticizing unit that is closer to an outer peripheral portion of the barrel than the communication hole in a direction along the groove forming surface; and
a heating unit configured to heat a material supplied between the barrel and the screw, and
the pressure sensor is disposed at a position closer to the cooling unit than the heating unit.

11. A three-dimensional shaping device, comprising:
the material delivery device according to claim 1; and
a stage on which the plasticized material delivered from the nozzle is deposited.

12. An injection molding device, comprising:
the material delivery device according to claim 1;
an injection control unit having a second cylinder coupled to the communication flow path and a plunger moving in the second cylinder, and configured to weigh the plasticized material in the second cylinder and deliver the weighed plasticized material toward the nozzle; and
a mold to which the plasticized material from the nozzle is delivered.

13. The injection molding device according to claim 12, wherein
the second cylinder is coupled upstream of a coupling portion between the communication flow path and the first cylinder in the communication flow path.

14. The injection molding device according to claim 12, wherein
the second cylinder is coupled downstream of a coupling portion between the communication flow path and the first cylinder in the communication flow path.

* * * * *